(No Model.)
J. W. HEYER.
DRILLING MACHINE.
No. 365,744. Patented June 28, 1887.
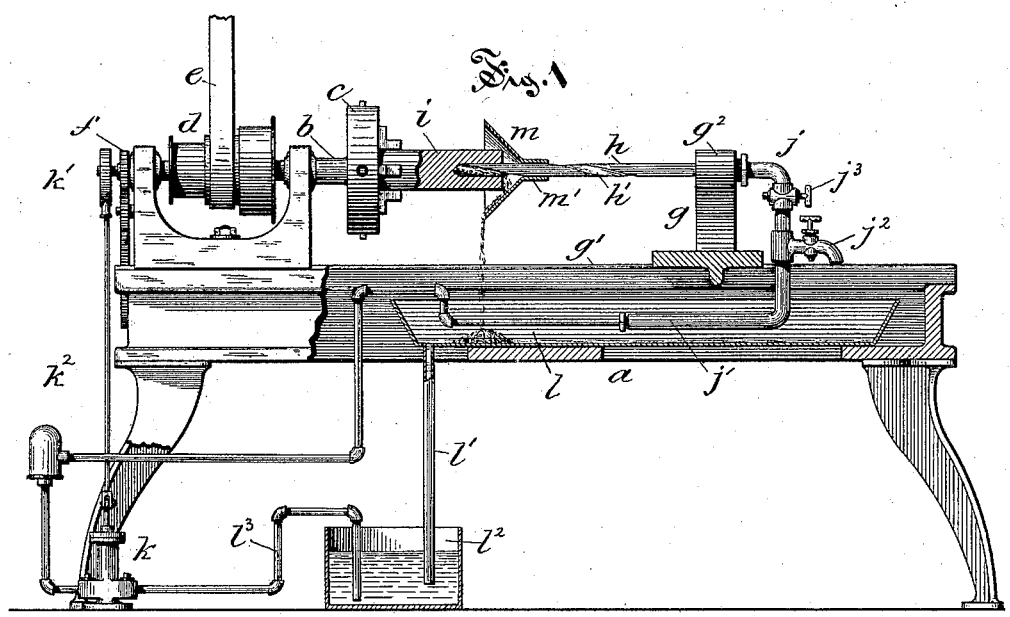
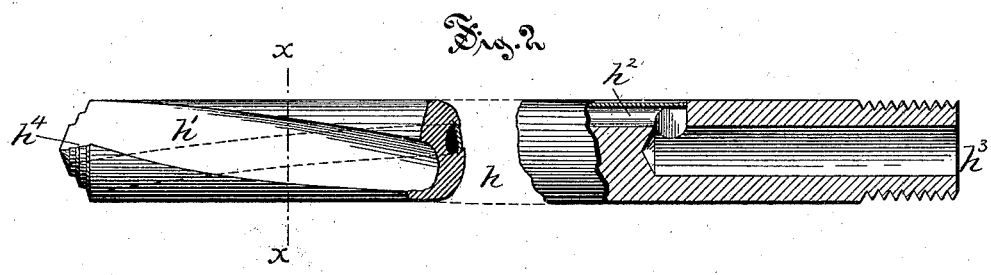
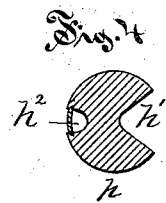
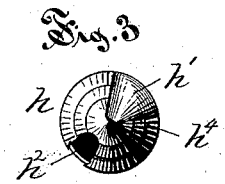
Witnesses:
W. M. Bjorkman,
H. R. Williams.
Inventor:
John W. Heyer,
by Simonds & Burdett,
Attys

UNITED STATES PATENT OFFICE.

JOHN WORTH HEYER, OF HARTFORD, CONNECTICUT, ASSIGNOR TO THE PRATT & WHITNEY COMPANY, OF SAME PLACE.

DRILLING-MACHINE.

SPECIFICATION forming part of Letters Patent No. 365,744, dated June 28, 1887.

Application filed January 13, 1887. Serial No. 224,286. (No model.)

*To all whom it may concern:*

Be it known that I, JOHN WORTH HEYER, of Hartford, in the county of Hartford and State of Connecticut, have invented certain new and useful Improvements in Drills and Drilling, of which the following is a full, clear, and exact description, whereby any one skilled in the art can make and use the same.

My invention relates particularly to the class of drills used for working in metal; and its object is to provide a drill with means for using the same that increase the amount of work that may be done with a given size of drill of my improved form as compared with prior drills and methods of using them.

My improvement consists in the combination, in a drilling-machine, of a drill having an outward-opening flute or channel extending along it from at or near the point to the shank of the drill, and having also a covered channel extending lengthwise of the drill and opening at or near the point that has its cutting-lip of irregular profile.

My improvement further consists in the said drill, in combination with a pump or like device, and a system of pipes by means of which oil or a like lubricant may be forced through the channel and flute past the cutting-edge of the point of the drill, so as to carry out with the outflowing oil the chips made by the drill in boring; and it still further consists in details of the device, in combination with the operative mechanism, all as more particularly hereinafter described, and pointed out in the claims.

Referring to the drawings, Figure 1 denotes a lathe of ordinary form, to which is attached an apparatus for practicing my within-described improvement, parts of the lathe and attachments being cut away to show construction. Fig. 2 is a side view, on enlarged scale, of one of my improved drills, with parts broken away to show construction. Fig. 3 is an end view of this drill. Fig. 4 is a view in cross-section of the same on plane denoted by line *x x* of Fig. 2.

My improvements in drills and drilling, as herein illustrated and described, are shown in connection with an ordinary lathe, although my invention is obviously capable of a somewhat extended application in other forms of machines.

In the accompanying drawings, the letter $a$ denotes the bed of the lathe, $b$ the driving or stock-carrying spindle, $c$ a chuck fast thereto, and $d$ pulleys fast to the spindle, and affording the means whereby the latter is driven by the belt $e$.

The usual train of gears driven from the gear-wheel $f$ on the end of the driving-spindle operate the feed-screw, by means of which the carriage $g$ is moved back and forth along the ways $g'$, in the usual manner. The arm $g^2$, fast to the carriage, has a socket, the axis of which is in line with the axis of the driving-spindle, and in this socket is secured, as by means of the screw-thread, a drill, $h$, the point of the drill extending toward the chuck, in which a piece of work is securely fastened. As the carriage is fed toward the head of the lathe the point of the drill encounters the end of the work as it revolves and bores a hole into the end of such work, and of any desired depth within the working length of the drill. This drill $h$, while broadly of the form commonly used for drilling metal, is of peculiar construction, as it has not only the ordinary flute, $h'$, extending along the drill and opening outward in the usual manner, but it is also perforated or provided with a covered channel, $h^2$, that opens at one end at or near the point of the drill and through the center of the shank at the end $h^3$, and this may be properly termed a "fluid-conducting" drill. The point of the drill is provided with a cutting-edge, $h^4$, of irregular profile, this irregular profile being produced by forming the end of the drill in a series of steps, as illustrated in Figs. 2 and 3 of the drawings, the sloping surfaces of the several steps being substantially parallel to each other, and formed at an angle with the axis of the drill, that best facilitates the cutting action of the lip in the material for use in which any particular drill is adapted.

At the outer end of the shank of the drill, where it is secured in the socket in the arm of the carriage, the end of the supply-pipe $j$ is so connected that the lubricating material, as oil, is forced from the pump $k$ through this supply-pipe and passes into and along the channel $h^2$ in the drill and into the hole in the work at the point end of the drill. An expansion-joint, $j'$, is provided in this supply-pipe, in order to permit the carriage to move back and forth along the ways freely without interrupting the supply of oil, and a cock, $j^2$, is provided below the stop-cock $j^3$ in this supply-pipe—the former to provide for the outflow of oil that begins to pass through this supply-pipe under pressure as soon as the lathe is started up and before the drill begins to bore. As soon as the point of the drill reaches the work this cock $j^2$ is closed and the cock $j^3$ opened, thus allowing the oil to be forced along the drill. The pump is driven by the eccentric $k'$, fast to the driving-spindle, the strap of which eccentric is attached by the connecting-rod $k^2$ with the piston of the pump. The chips made by the drill in its work and the outflowing oil are caught in a tank, $l$, supported on the frame of the lathe, and the tank may be supplied with an overflow-pipe, $l'$, that leads to a tank, $l^2$, from which the suction-pipe $l^3$ draws the supply of oil for the pump.

In order to prevent the spattering of the oil and chips that are forcibly driven out along the flute $h'$, a funnel-shaped guard, $m$, is provided. This guard has a tubular shank, $m'$, with a finger extending into the flute, so as to close it against the passage of the oil, while the flaring mouth of the guard covers more or less of the end of the work.

The peculiar form of the point of the drill in its division into the series of steps is for the purpose of breaking up into small pieces the chips formed by the cutting-edge, so as to facilitate the ejection of the chips from the hole with the lubricating-fluid that is forced into and along the covered channel in the drill.

I am of course aware that it is not new to use a stream of oil directed into a hole bored by a drill for the purpose of clearing such a hole of chips; but such means of clearing a hole have usually necessitated a stopping of the work and the use of a syringe or the like device that ejects the current of oil into the hole along the flute, the chips flowing outward along the same flute, and such methods and devices I do not broadly claim.

I claim as my improvement—

1. In a drilling-machine, in combination with the drill-holding device, a drill having an outward-opening channel along its length, and also a covered channel opening at or near the end of the shank, and at or near the point of the drill, all substantially as described, and for the purpose set forth.

2. In a drilling-machine, in combination with the drill-holding device, a drill having an outward-opening channel or flute extending backward from the cutting-lip at or near the point of the drill, and also a covered channel opening at or near the point of the drill and at or near its opposite end, the said point having a cutting-edge of irregular profile produced by the formation of the point into a series of conical and annular surfaces, all substantially as described.

3. In a drilling-machine, in combination with the drill-holding device, a twist-drill having its point end and cutting-edge on the point broken into irregular profile by a series of steps, the sloping surfaces of which are substantially parallel to each other and are inclined at an angle with the axis of the drill, all substantially as described.

4. In combination with a driving-spindle and a rotary chuck fast thereto, a drill, $h$, having the outlet-flute $h'$, and the covered channel $h^2$, opening at or near the point of the drill and at the shank end, the supply-pipe $j$, and the connected pump or equivalent device, by means of which a lubricating-fluid is forced through the drill, all substantially as described.

5. In combination with a driving-spindle and chuck $c$, the drill $h$, with its open flute $h'$, and the covered channel $h^2$, the latter opening at or near the point of the drill and at or near the shank end thereof, the supply-pipe and pump for supplying a lubricating-fluid to the drill under pressure, and a guard, $m$, all substantially as described.

6. In combination with the driving-spindle $b$, with the chuck $c$, the eccentric $k'$, fast to the said spindle, the connecting-rod $k^2$, the pump $k$, with a connected suction-pipe, $l^3$, the supply-pipe $j$, the cocks $j^2$ and $j^3$, and the drill $h$, with the covered channel $h^2$, communicating with the supply-pipe and opening at the other end at the point of the drill that has also the open channel $h'$, all substantially as described.

7. In combination, in a drilling-machine, a stock-carrying spindle, the drill-carrying carriage, the longitudinally-perforated drill borne on said carriage, a fluid-pump, and a fluid-conductor from said pump to the drill, whereby the fluid is forcibly fed to the drill-point through the drill during the process or operation of drilling, all substantially as described.

8. The combination, in a drilling-machine, of the stock-carrying spindle, the drill-carrying carriage, the fluid-conducting drill attached to and borne by the said carriage, the force-pump operatingly connected with the said spindle, and the extensible pipe-connections, whereby the fluid, as oil, is carried from the pump to the drill, all substantially as described.

JOHN WORTH HEYER.

Witnesses:
CHAS. L. BURDETT,
H. R. WILLIAMS.